(12) United States Patent
Tanihata et al.

(10) Patent No.: US 11,681,481 B2
(45) Date of Patent: Jun. 20, 2023

(54) INFORMATION PROCESSING APPARATUS

(71) Applicant: FUJIFILM BUSINESS INNOVATION CORP., Tokyo (JP)

(72) Inventors: Tomoki Tanihata, Kanagawa (JP); Shinho Ikeda, Kanagawa (JP); Asahito Shioyasu, Kanagawa (JP); Hisashi Noda, Kanagawa (JP); Kenta Nomura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 514 days.

(21) Appl. No.: 16/749,242

(22) Filed: Jan. 22, 2020

(65) Prior Publication Data

US 2021/0019098 A1    Jan. 21, 2021

(30) Foreign Application Priority Data

Jul. 17, 2019  (JP) .............................. JP2019-131591

(51) Int. Cl.
*G06F 3/12*  (2006.01)
*G06F 1/3209*  (2019.01)
*G06F 1/3234*  (2019.01)
*G06F 1/3296*  (2019.01)
*G06F 1/3206*  (2019.01)

(52) U.S. Cl.
CPC .......... *G06F 3/1229* (2013.01); *G06F 1/3209* (2013.01); *G06F 1/3284* (2013.01); *G06F 1/3296* (2013.01); *G06F 3/1286* (2013.01); *G06F 3/1292* (2013.01)

(58) Field of Classification Search
CPC .... G06F 3/1229; G06F 1/3209; G06F 1/3284; G06F 1/3296; G06F 3/1286; G06F 3/1292
See application file for complete search history.

(56) References Cited

U.S. PATENT DOCUMENTS

| | | | |
|---|---|---|---|
| 2010/0293403 A1* | 11/2010 | Yamashita | H04N 1/00885 713/323 |
| 2013/0036319 A1* | 2/2013 | Tanaka | G06F 1/3293 713/323 |
| 2018/0253318 A1 | 9/2018 | Hara | |
| 2020/0387209 A1* | 12/2020 | Nicholas | G06F 1/3293 |

FOREIGN PATENT DOCUMENTS

JP    2018-144331 A    9/2018

* cited by examiner

*Primary Examiner* — Jaweed A Abbaszadeh
*Assistant Examiner* — Gayathri Sampath
(74) *Attorney, Agent, or Firm* — Oliff PLC (57) ABSTRACT

An information processing apparatus includes a first controller and a second controller. The first controller is configured to control an operation of the overall information processing apparatus. The second controller is configured to control an operation of a device. When detecting a trigger of resumption from a power saving mode, the second controller notifies the first controller of the detection of the trigger, and starts to initialize a function corresponding to the trigger.

8 Claims, 9 Drawing Sheets

SHIFT TO POWER SAVING MODE

FIG. 8B

RETURN FROM POWER SAVING MODE

FIG. 8C

INFORMATION PROCESSING APPARATUS

CROSS-REFERENCE TO RELATED APPLICATIONS

This application is based on and claims priority under 35 USC 119 from Japanese Patent Application No. 2019-131591 filed on Jul. 17, 2019.

BACKGROUND

(i) Technical Field

The present disclosure relates to an information processing apparatus.

(ii) Related Art

An image forming apparatus having multiple functions is provided with a controller (hereinafter referred to as "system controller") that controls an operation of a system, and a controller (hereinafter referred to as "device controller") that controls operations of devices.

When the image forming apparatus resumes from an operation mode (hereinafter referred to as "power saving mode") in which consumed power is lower than that in a normal mode, the following method may be employed. That is, the system controller provides an initialization program and a trigger of the resumption to the device controller to thereby limit functions to be initialized by the device controller, and as a result, a time (hereinafter referred to as "resumption time") required for resumption is shortened.

SUMMARY

In order for the system controller to give, to the device controller, information that defines a function to be initialized by the device controller, it is required as a premise that communication is established between the system controller and the device controller. In other words, the device controller cannot start the initialization until communication is established between the two controllers.

Aspects of non-limiting embodiments of the present disclosure relate to shorten time required for resumption from a power saving mode as compared with a case in which initialization performed by a second controller is started after communication is established between a first controller that controls an operation of an overall apparatus and the second controller that controls an operation of a device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a first controller and a second controller. The first controller is configured to control an operation of the overall information processing apparatus. The second controller is configured to control an operation of a device. When detecting a trigger of resumption from a power saving mode, the second controller notifies the first controller of the detection of the trigger, and starts to initialize a function corresponding to the trigger.

BRIEF DESCRIPTION OF THE DRAWINGS

Exemplary embodiment(s) of the present disclosure will be described in detail based on the following figures, wherein:

FIG. 3A shows a case in which the trigger of resumption is USB communication, FIG. 3B shows a case in which the trigger of resumption is wired LAN communication, and FIG. 3C shows a case in which the trigger of resumption is Wi-Fi communication;

FIGS. 6A and 6B are diagrams showing examples of tables used for generating and decoding an identification signal, FIG. 6A shows an example of a table used for generating an identification signal according to a trigger of resumption, and FIG. 6B shows an example of a table used for decoding the trigger of resumption from the identification signal;

FIGS. 8A to 8C are diagrams showing a transition of operation states of respective devices related to printing with Wi-Fi direct in an image forming apparatus used in an exemplary embodiment 3, FIG. 8A shows operation states of the devices before being shifted to a power saving mode, FIG. 8B shows operation states of the devices in the power saving mode, and FIG. 8C shows operation states of the devices after resuming from the power saving mode.

DETAILED DESCRIPTION

Hereinafter, exemplary embodiments of the present disclosure will be described with reference to the accompanying drawings.

Exemplary Embodiment 1

Configuration of Apparatus

In the present exemplary embodiment, an image forming apparatus that forms an image on a recording medium such as paper will be described as an example of an information processing apparatus. The image forming apparatus according to the present exemplary embodiment has a function of reading an image of an original document in addition to a function of printing an image on paper.

Figure 1:
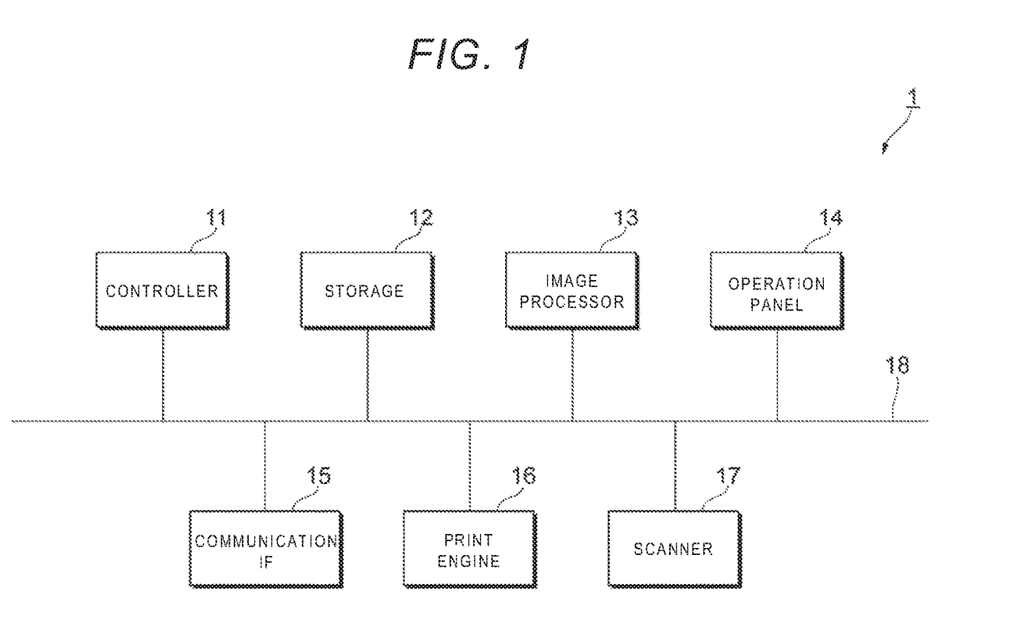
FIG. 1 is a diagram showing an example of a hardware configuration of an image forming apparatus used in an exemplary embodiment 1.

FIG. 1 is a diagram showing an example of a hardware configuration of an image forming apparatus 1 used in the exemplary embodiment 1.

The image forming apparatus 1 shown in FIG. 1 includes a controller 11, a storage 12 that stores image data, an image processor 13 that performs processing such as color correction and tone correction on an image represented by image data, an operation panel 14 used for a user's operation, a communication interface (IF) 15 used for communication with an external device, a print engine 16 that is a machine that executes printing, and a scanner 17 that reads an image of an original document. These elements are connected through a bus 18 or a board-shaped wiring. For example, a peripheral component interconnect (PCI) bus is used as the bus 18.

The controller 11 has a main central processing unit (CPU) and a sub CPU. The main CPU is used to control an operation of the overall image forming apparatus 1. The sub CPU is used to control operations of devices. The devices here are the image processor 13, the operation panel 14, the communication IF 15, the print engine 16, and the scanner 17.

The storage 12 is a nonvolatile storage device. The storage 12 includes, for example, a hard disk device. The storage 12 stores an image read by the scanner 17 and image data received from an external device.

The image processor 13 is implemented by a dedicated processor or a processing circuit.

The operation panel 14 includes, for example, a touch panel and various switches and buttons. The touch panel includes a display panel that displays an interface screen and a touch sensor that detects a user's operation.

The communication IF 15 is a module used for communication with an external device. The communication IF 15 includes, for example, a universal serial bus (USB) module, a wired local area network (LAN) module compliant with Ethernet (registered trademark), and a Wi-Fi (registered trademark) module.

The print engine 16 is a device corresponding to an electrophotographic system or an inkjet system. The print engine 16 corresponding to the electrophotographic system includes a photoconductor, an electrode for charging the photoconductor, an exposure light source, a developer, a transfer roller, and a fixing roller. On the other hand, the print engine 16 corresponding to the inkjet system includes a head in which small-diameter holes through each of which an ink droplet is ejected are arranged. The inkjet systems are classified into two systems, that is, (i) a system in which the head is moved in a main scanning direction and (ii) a system in which paper is moved in a sub-scanning direction with the head that is longer than a width of paper in the main scanning direction being fixed. The print engine 16 is an example of a machine that prints an image on paper.

The scanner 17 is compatible with both (i) a mode in which an image is read while an optical system is moved relatively to an original document and (ii) a mode in which an image is read while an original document is moved relatively to the optical system with the optical system being fixed. In the present exemplary embodiment, the scanner 17 is mounted with a device for automatically conveying an original document to an image read position. The device is called an auto document feeder (ADF).

Figure 2:
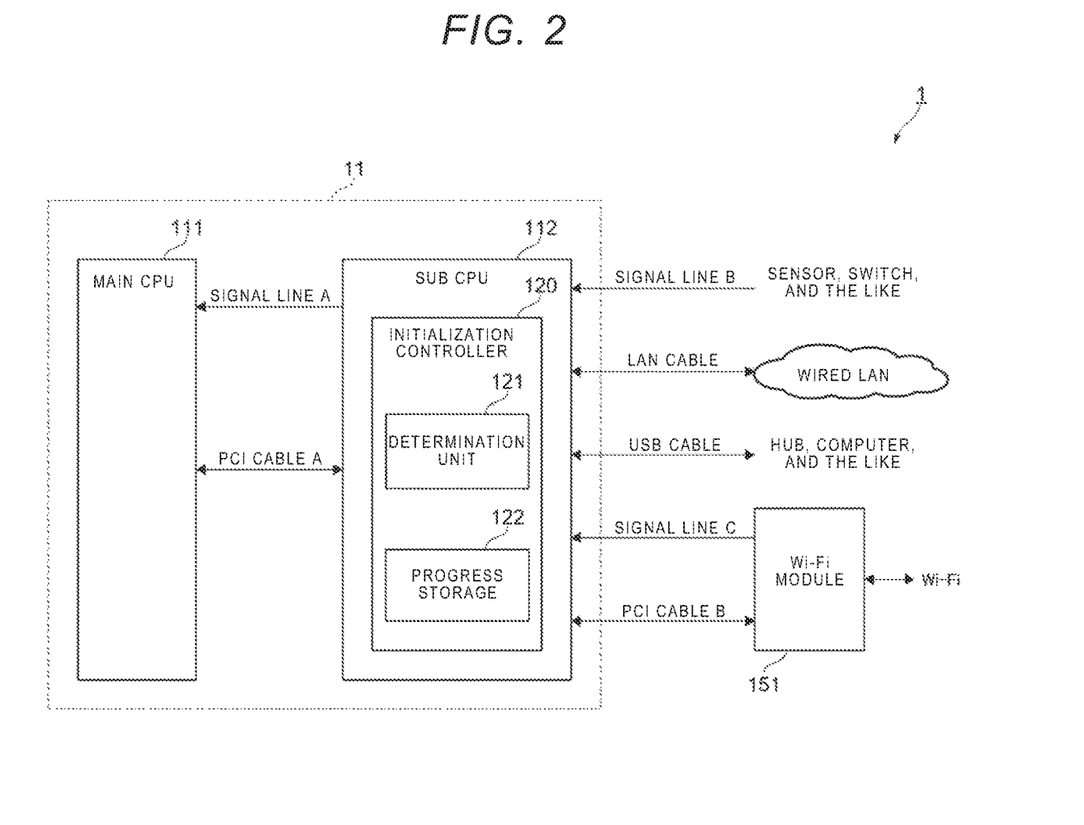
FIG. 2 is a diagram showing a configuration example of a controller provided in the image forming apparatus used in the exemplary embodiment 1.

FIG. 2 is a diagram showing a configuration example of the controller 11 provided in the image forming apparatus 1 used in the exemplary embodiment 1.

As shown in FIG. 2, the controller 11 includes the main CPU 111 and the sub CPU 112.

Although not shown, the main CPU 111 is connected to a read only memory (ROM) storing firmware and a boot program, and a random access memory (RAM) used as a work area. The main CPU 111 as a whole constitutes a system controller. The system controller is an example of a first controller.

The sub CPU 112 is connected to a ROM storing a resumption program and a RAM used as a work area. The sub CPU 112 as a whole constitutes a device controller. The device controller is an example of a second controller.

Hereinafter, the main CPU 111 and the sub CPU 112 are treated as representatives of the respective controllers, and the respective controllers will be referred to as the main CPU 111 and the sub CPU 112.

The main CPU 111 is supplied with power necessary for receiving a notification from the sub CPU 112 even in the power saving mode. Similarly, the sub CPU 112 is also supplied with power necessary for receiving a notification from the devices even in the power saving mode.

The main CPU 111 and the sub CPU 112 are connected by a signal line A and a PCI cable A.

Here, the signal line A is a wiring used for communication in the power saving mode, and includes, for example, one metal line. The signal line A is used for communication of two states respectively associated with "1" and "0" or digital signals. The same applies to other signal lines to be described later.

Communication using the PCI cable A can be performed after initialization of a PCI bus module (not shown). Therefore, before the PCI bus module is initialized, communication between the main CPU 111 and the sub CPU 112 is limited to communication using the signal line A.

The sub CPU 112 is provided with an initialization controller 120 to implement a function of shortening time for resumption from the power saving mode.

The initialization controller 120 has a function of starting initialization of a function corresponding to a detected trigger of resumption without waiting for an instruction from the main CPU 111.

The initialization controller 120 used in the present exemplary embodiment includes a determination unit 121 that determines a function to be initialized according to a detected trigger of resumption, and a progress storage 122 that stores progress information on a progress of initialization.

The determination unit 121 monitors occurrence of an event (hereinafter referred to as a "resumption event") that is a trigger of resumption from the power saving mode.

For example, a user's operation of a switch is notified to the sub CPU 112 as a change in a state of the operated switch. For the notification, a dedicated signal line B is used that connects each device that the user can operate and the sub CPU 112 in a one-to-one correspondence manner. That is, there are as many signal lines B as the number of devices. The determination unit 121 detects a device in which a resumption event occurs, based on a change in electric potential appearing on the signal line B.

Reception of a packet from an external device connected to the wired LAN is notified to the sub CPU 112 through a wired LAN module. The wired LAN module is capable of receiving a packet even in the power saving mode. When the trigger of resumption is the reception of the packet from the wired LAN, the determination unit 121 specifies the wired LAN module as an initialization target.

Reception of a packet from a hub or a computer connected by a USB cable is notified to the sub CPU 112 through the USB module. The USB module is also capable of receiving a packet in the power saving mode. When the trigger of resumption is the reception of the packet from the USB cable, the determination unit 121 specifies the USB module as an initialization target.

When a Wi-Fi (registered trademark) module 151 receives a packet addressed to itself, the Wi-Fi module 151 notifies the sub CPU 112 of the reception of the packet through a dedicated signal line C. The Wi-Fi module 151 is also capable of receiving a packet in the power saving mode. In this case, the sub CPU 112 specifies, as an initialization target, a PCI bus module that controls a PCI cable B used for connection of the sub CPU 112 and the Wi-Fi module 151.

The progress storage 122 stores the progress information on the progress of the initialization executed by the sub CPU 112. The progress storage 122 is implemented, for example, by a semiconductor memory. The progress information on the progress of the initialization stored in the progress storage 122 is read in response to an inquiry from the main CPU 111 and is transmitted to the main CPU 111 as a response.

Figure 3A:
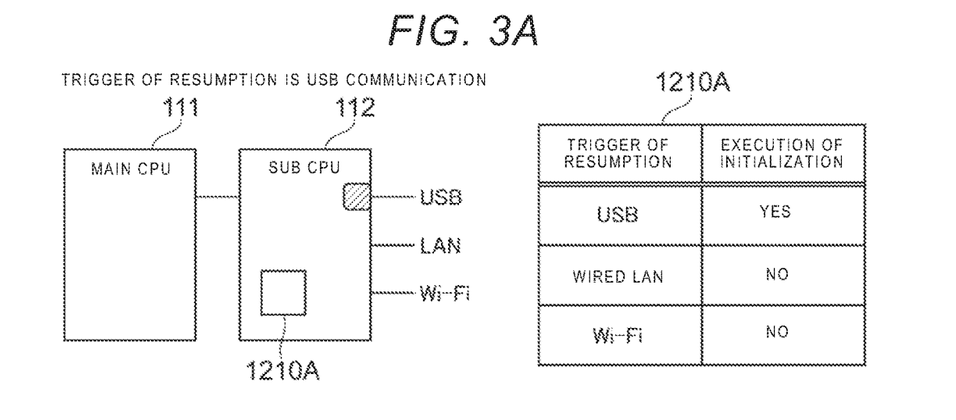
FIGS. 3A to 3C are diagrams showing a relationship between a type of communication which is a trigger of resumption and a function which is an initialization target.
Figure 3B:
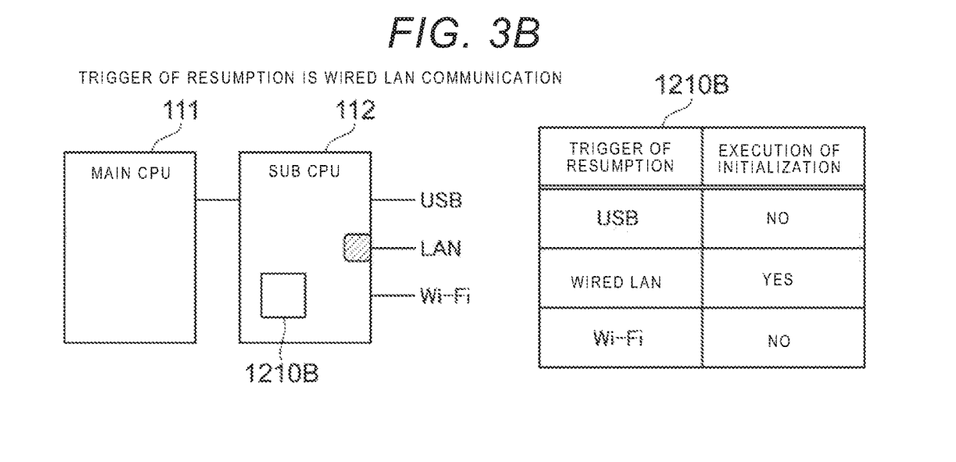
Figure 3C:
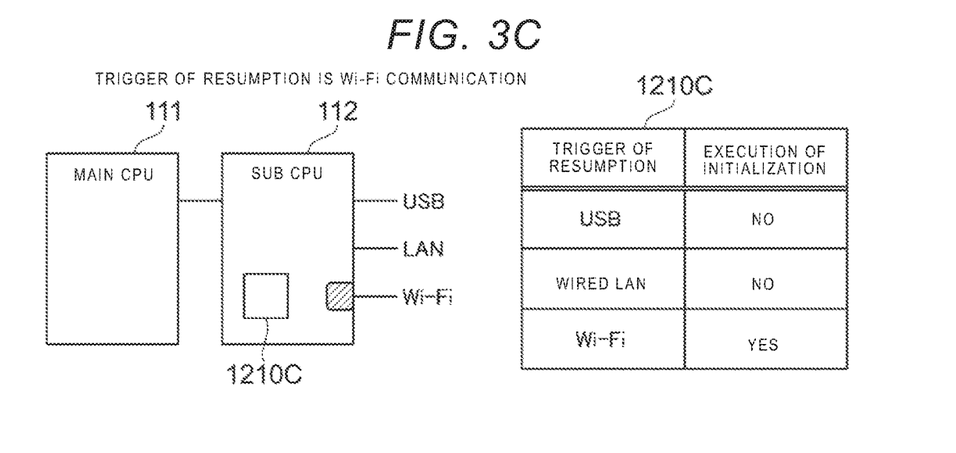

FIGS. 3A to 3C are diagrams showing a relationship between a type of communication that is the trigger of resumption and a function which is an initialization target. FIG. 3A shows a case in which the trigger of resumption is USB communication. FIG. 3B shows a case in which the trigger of resumption is wired LAN communication. FIG. 3C shows a case in which the trigger of resumption is Wi-Fi communication.

In the present exemplary embodiment, the determination unit 121 (see FIG. 2) is provided with tables 1210A, 1210B, and 1210C in which a function to be initialized and functions not to be initialized are assigned for each trigger of resumption.

For example, when the trigger of the resumption is the USB communication, the determination unit 121 refers to the table 1210A and initializes only a function related to the USB communication. In other words, the wired LAN communication and the Wi-Fi communication that are not related to the trigger of resumption are excluded from the initialization target.

By limiting the function to be initialized, time required for initialization is shortened as compared with a case in which all functions are initialized. Since a function that does not need to be resumed is maintained in the power saving mode, an increase in consumed power is reduced as compared with a case in which all functions are resumed from the power saving mode.

When the trigger of the resumption is the wired LAN communication, the determination unit 121 refers to the table 1210B and initializes only a function related to the wired LAN communication. When the trigger of the resumption is Wi-Fi communication, the determination unit 121 refers to the table 1210C and initializes only a function related to the Wi-Fi communication.

Resumption Operation from Power Saving Mode

Hereinafter, a resumption operation from the power saving mode executed in the controller 11 (see FIG. 2) will be described.

Figure 4:
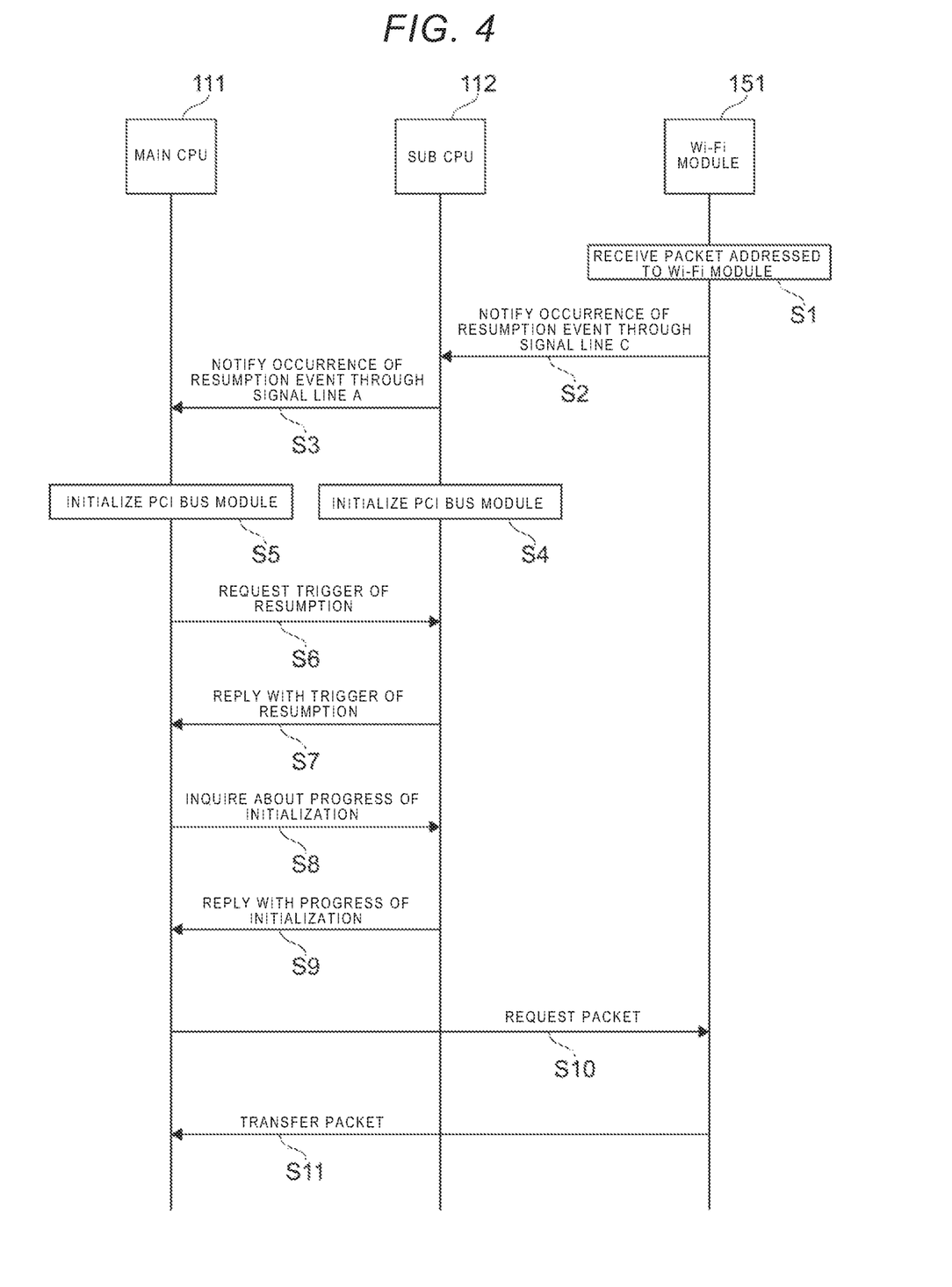
FIG. 4 is a diagram showing an example of a resumption operation from a power saving mode executed in the exemplary embodiment 1.

FIG. 4 is a diagram showing an example of the resumption operation from the power saving mode executed in the exemplary embodiment 1. In the drawings, the sign "S" means a step. In FIG. 4, it is assumed that the trigger of the resumption is the Wi-Fi communication.

First, the Wi-Fi module 151 in the power saving mode receives a packet addressed to itself (step 1).

The Wi-Fi module 151 that detects the reception of the packet addressed to itself notifies the sub CPU 112 of occurrence of a resumption event through the signal line C (step 2). For example, the Wi-Fi module 151 changes an electric potential state of the signal line C from 0 to 1.

The sub CPU 112 that receives the notification notifies the main CPU 111 of the occurrence of the resumption event through the signal line A (step 3). For example, the sub CPU 112 changes an electric potential state of the signal line A from 0 to 1.

The sub CPU 112 initializes the PCI bus module (step 4). In the present exemplary embodiment, initialization on a sub CPU 112 side starts without waiting for an initialization instruction from the main CPU 111.

When the main CPU 111 receives the notification of the occurrence of the resumption event via the signal line A, the main CPU 111 initializes the PCI bus module (step 5). As shown in FIG. 4, the initialization on a main CPU 111 side and the initialization on the sub CPU 112 side proceed in parallel.

Therefore, time for completing both the initialization on the main CPU 111 side and the initialization on the sub CPU 112 side can be shortened, as compared with a case in which the initialization on the sub CPU 112 side starts after the initialization on the main CPU 111 side ends. Shortening of the time for completing the initializations means shortening of the time required for resumption from the power saving mode.

The main CPU 111 requests the trigger of the resumption from the sub CPU 112 by using the PCI cable A (step 6). The sub CPU 112 replies to the main CPU 111 with the trigger of the resumption as a response to the inquiry (step 7). In this example, the trigger of the resumption is the reception of the packet by the Wi-Fi module 151.

Next, the main CPU 111 inquires the sub CPU 112 about a progress of the initialization using the PCI cable A (step 8). The progress information on the progress of the initialization on the sub CPU 112 side is stored in the progress storage 122 (see FIG. 2). The sub CPU 112 replies to the main CPU 111 with the progress information on the progress of the initialization read from the progress storage 122 (step 9).

The inquiry and reply are repeated until the main CPU 111 confirms completion of the initialization on the sub CPU 112 side.

When confirming the completion of the initialization on the sub CPU 112 side, the main CPU 111 requests a packet from the Wi-Fi module 151 (step 10). This request is transmitted to the Wi-Fi module 151 through the PCI cable A and the PCI cable B.

The Wi-Fi module 151 that receives the packet request transfers the received packet to the main CPU 111 (step 11).

As described above, time until resumption of the Wi-Fi communication in the image forming apparatus 1 is shortened, as compared with the case in which the initialization on the sub CPU 112 side starts after the initialization on the main CPU 111 side ends. The same applies when the wired LAN communication or the USB communication is detected in the power saving mode.

Exemplary Embodiment 2

In the exemplary Embodiment 1, the main CPU 111 (see FIG. 2) does not know the trigger of the resumption at a time when receiving the notification of the occurrence of the resumption event from the sub CPU 112 (see FIG. 2). Therefore, the main CPU 111 initializes all drivers including a driver used for the Wi-Fi communication. This operation is a cause that prolongs initialization on the main CPU 111 side. In the main CPU 111 that resumes from the power saving mode, power is consumed to operate drivers that are not related to a trigger of resumption.

Then, in the present exemplary embodiment, an image forming apparatus will be described in which the time required for resumption from the power saving mode is shortened as compared with the exemplary embodiment 1 and a driver to be initialized is limited to prevent an increase in power consumed by the main CPU 111.

Figure 5:
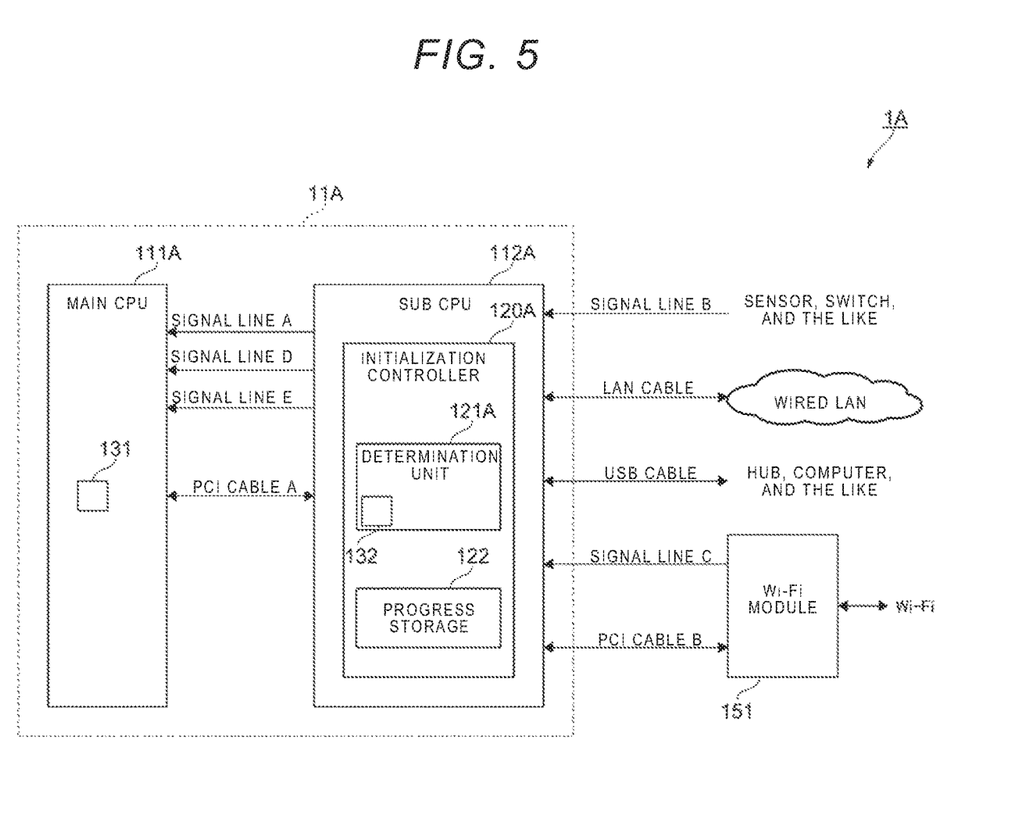
FIG. 5 is a diagram showing a configuration example of a controller provided in an image forming apparatus used in an exemplary embodiment 2.

FIG. 5 is a diagram showing a configuration example of a controller 11A provided in an image forming apparatus 1A used in the exemplary embodiment 2. In FIG. 5, corresponding reference numerals are assigned to elements corresponding to the elements in FIG. 2.

The controller 11A shown in FIG. 5 includes a main CPU 111A and a sub CPU 112A.

In the present exemplary embodiment, two signal lines D and E are newly provided between the main CPU 111A and the sub CPU 112A. The signal lines D and E are used as a pair to transmit an identification signal indicating a trigger of resumption from the sub CPU 112A to the main CPU 111A. Notification of the identification signal is executed simultaneously with the notification of the occurrence of the resumption event using the signal line A.

The main CPU 111A is provided with a table 131 used for decoding the trigger of resumption from the received identification signal.

The sub CPU 112A is provided with a table 132 used for generating an identification signal corresponding to the trigger of the resumption. In FIG. 5, the table 132 is provided in a determination unit 121A of an initialization controller 120A.

Figure 6A:
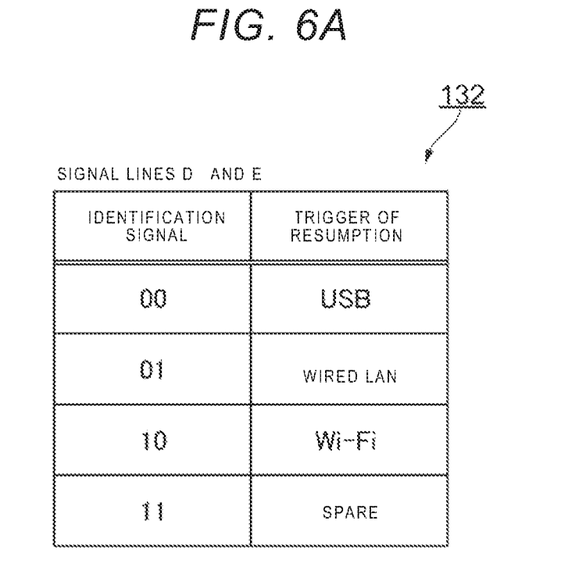
Figure 6B:
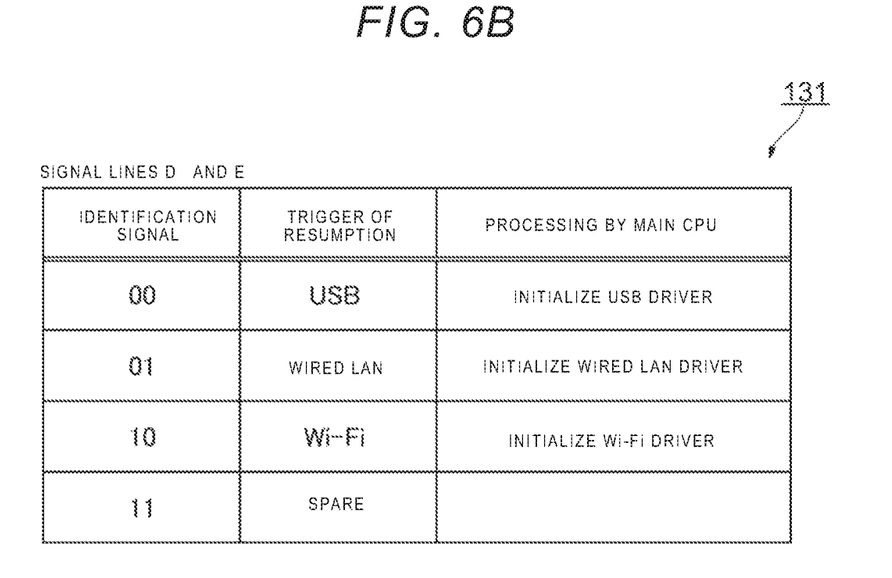

FIGS. 6A and 6B show respective examples of the table 132 and table 131 which are respectively used for generating and decoding an identification signal. FIG. 6A shows an example of the table 132 used for generating an identification signal corresponding to the trigger of the resumption. FIG. 6B shows an example of the table 131 used for decoding the trigger of the resumption from the identification signal.

In the table 132 shown in FIG. 6A, "00" is assigned to the USB communication which is a trigger of resumption. "01" is assigned to the wired LAN communication which is a trigger of resumption. "10" is assigned to Wi-Fi communication which is a trigger of resumption. "11" is used as a spare. The identification signal "10" means that a signal transmitted through the signal line D is "1" and a signal transmitted through the signal line E is "0".

Processing to be executed by the main CPU 111A according to each identification signal is written in the table 131. For example, the identification signal "00" is associated with initialization of a USB driver. The identification signal "01" is associated with initialization of a wired LAN driver. The identification signal "11" is associated with initialization of a Wi-Fi driver.

When the main CPU 111A of the present exemplary embodiment receives the notification of the occurrence of the resumption event and the identification signal, the main CPU 111A refers to the table 131 and limits the driver to be initialized.

Figure 7:
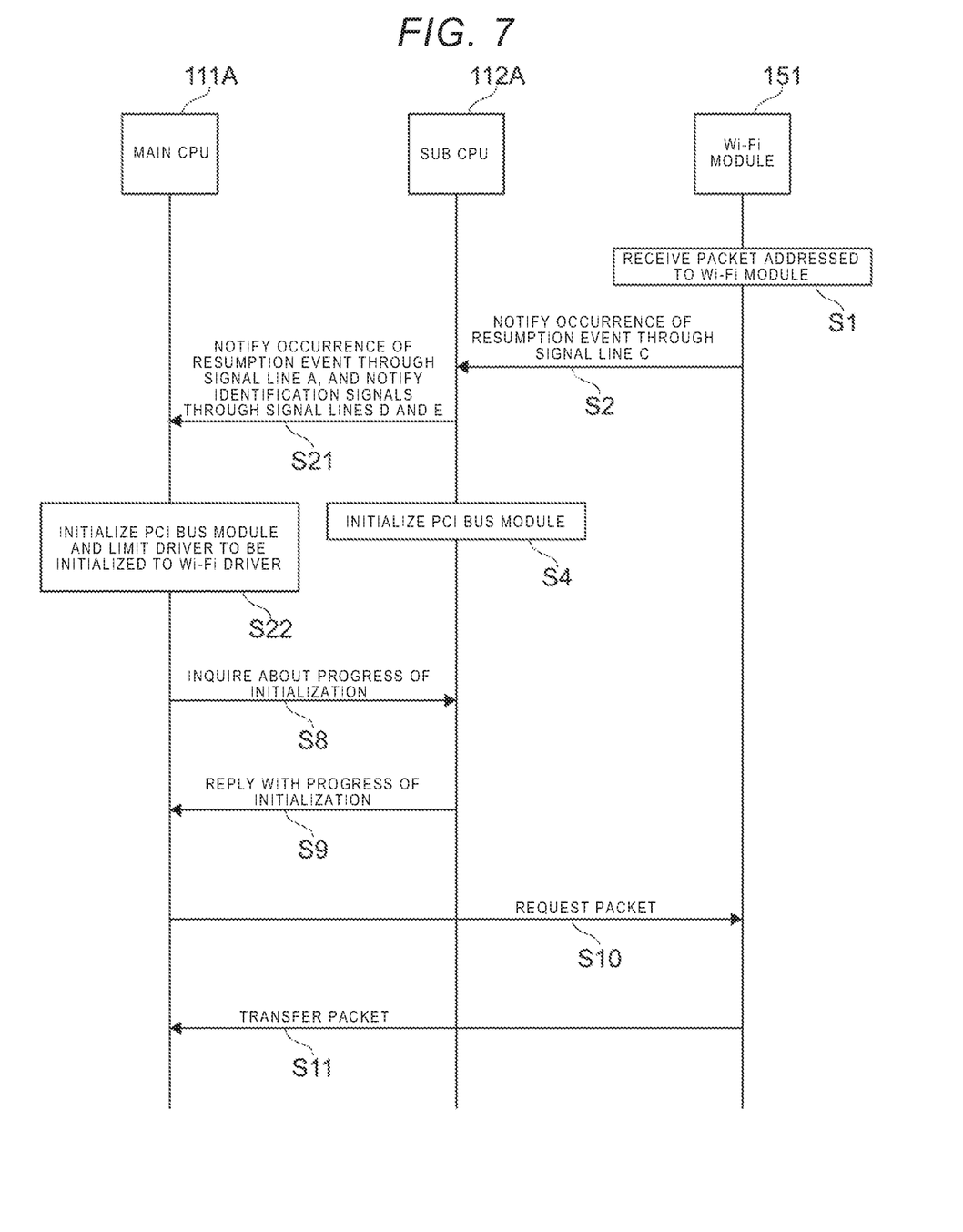
FIG. 7 is a diagram showing an example of a resumption operation from a power saving mode executed in the exemplary embodiment 2.

FIG. 7 is a diagram showing an example of a resumption operation from the power saving mode executed in the exemplary embodiment 2. In FIG. 7, corresponding reference numerals are assigned to elements corresponding to the elements in FIG. 4.

In FIG. 7, the Wi-Fi module 151 in the power saving mode receives a packet addressed to itself (step 1). The Wi-Fi module 151 that detects the reception of the packet addressed to itself notifies the sub CPU 112A of occurrence of a resumption event through the signal line C (step 2).

The sub CPU 112A that receives the notification notifies the main CPU 111A of the occurrence of the resumption event through the signal line A, and notifies the main CPU 111A of the identification signals through the signal lines D and E (step 21). At the same time, the sub CPU 112A initializes the PCI bus module (step 4). In the present exemplary embodiment, initialization on a sub CPU 112A side also starts without waiting for an initialization instruction from the main CPU 111A.

When the main CPU 111A receives the notification of the occurrence of the resumption event via the signal line A, the main CPU 111A initializes the PCI bus module and limits the driver to be initialized to the Wi-Fi driver (step 22).

Therefore, time required for initialization on the main CPU 111A side in the present exemplary embodiment is shortened as compared with the time required in the exemplary embodiment 1 when a trigger of resumption is the same.

In the present exemplary embodiment, the trigger of the resumption is notified from the sub CPU 112A to the main CPU 111A before the initialization starts.

Therefore, the main CPU 111A in the present exemplary embodiment inquires about the progress of the initialization on a sub CPU 112A side without inquiring the sub CPU 112A about the trigger of the resumption (step 8). The subsequent operations are the same as those in the exemplary embodiment 1.

Exemplary Embodiment 3

In the present exemplary embodiment, a case will be described in which the image forming apparatus 1 (see FIG. 1) is used as a master unit of Wi-Fi direct. That is, in the present exemplary embodiment, a case will be described in which the image forming apparatus 1 functions as an access point for Wi-Fi communication and directly performs Wi-Fi communication with an external device.

The image forming apparatus 1 in operation as the master unit of Wi-Fi direct shifts to the power saving mode if there is no operation for a long time. Even in this case, by adopting the technique described in the above exemplary embodiment, Wi-Fi communication is enabled in a shorter time than before.

A user connecting to the image forming apparatus 1 by Wi-Fi direct tends to have a high possibility of using a printing function of the image forming apparatus 1.

As described above, by adopting the technique described in the above exemplary embodiment, Wi-Fi communication is enabled in a shorter time than before. However, time for the print engine 16 (see FIG. 1) to resume to a state in which the print engine 16 is ready to print is longer than the time for completing the initialization of the controller 11 (see FIG. 1). Therefore, it is necessary for the user to wait for the start of printing by the print engine 16 even after he or she instructs printing through Wi-Fi connection.

Figure 8A:
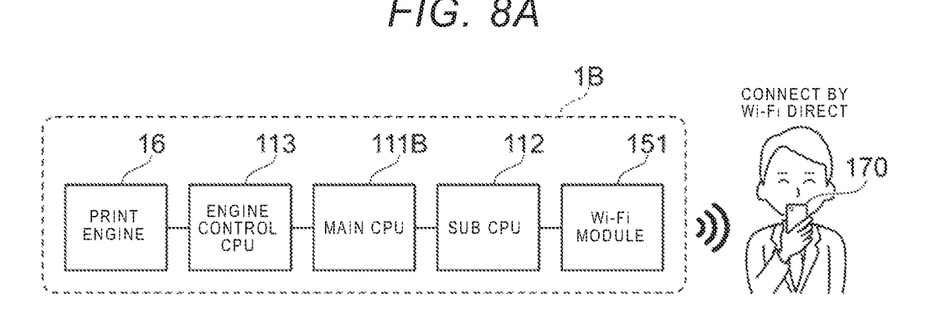
Figure 8B:
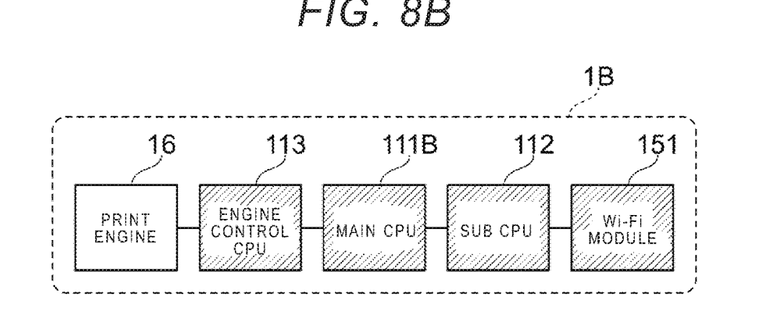
Figure 8C:
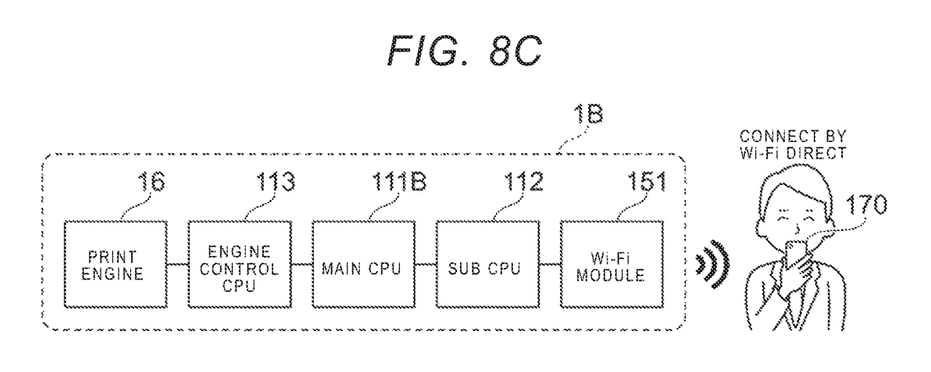

FIGS. 8A to 8C are diagrams showing a transition of operation states of respective devices related to printing by Wi-Fi direct, in an image forming apparatus 1B used in the exemplary embodiment 3. FIG. 8A shows operation states of the devices before shifting to a power saving mode. FIG. 8B shows operation states of the devices in the power saving mode. FIG. 8C shows operation states of the devices after resuming from the power saving mode. In FIGS. 8A to 8C, corresponding reference numerals are assigned to elements corresponding to the elements in FIG. 2.

FIGS. 8A to 8C show the print engine 16, an engine control CPU 113, a main CPU 111B, the sub CPU 112, and the Wi-Fi module 151 as devices related to printing by the Wi-Fi direct. The engine control CPU 113 here is a CPU that controls an operation of the print engine 16. The engine control CPU 113 is connected to the main CPU 111B and the print engine 16 by a PCI cable.

In FIGS. 8A to 8C, it is assumed that an external device connected to the image forming apparatus 1B by Wi-Fi direct is a smartphone 170.

Needless to say, all the devices are operating in a normal mode before shifting to the power saving mode. This stage corresponds to FIG. 8A.

When there is no operation for a long time, the main CPU 111B shifts the devices constituting the image forming apparatus 1B to the power saving mode.

Figure 9:
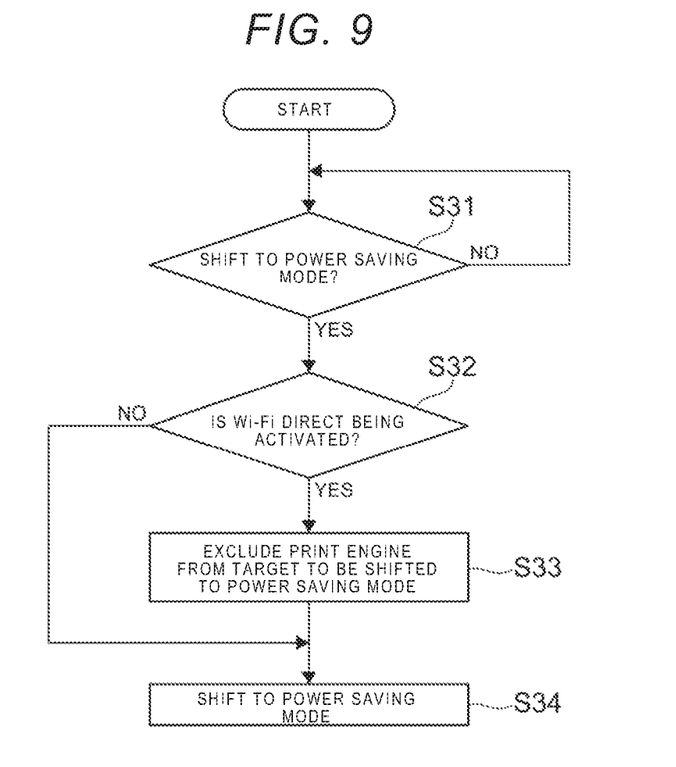
FIG. 9 is a flowchart showing an example of processing to be executed when a main CPU used in the exemplary embodiment 3 determines whether to shift the devices to the power saving mode.

FIG. 9 is a flowchart showing an example of processing to be executed when the main CPU 111B used in the exemplary embodiment 3 determines whether to shift the devices to the power saving mode.

First, the main CPU 111B determines whether to shift the devices to the power saving mode (step 31). The main CPU 111B repeats the determination of step 31 while a negative result is obtained in step 31.

If an affirmative result is obtained in step 31, the main CPU 111B determines whether the Wi-Fi direct is being activated (step 32).

If the affirmative result is obtained in step 32, the main CPU 111B excludes the print engine 16 from a target to be shifted to the power saving mode (step 33), and then shifts the other devices to the power saving mode (step 34).

On the other hand, if the negative result is obtained in step 32, the main CPU 111B proceeds directly to step 34. In this case, the print engine 16 is also shifted to the power saving mode.

Referring back to FIG. 8A, in the present exemplary embodiment, Wi-Fi direct is being activated in the image forming apparatus 1B before shifting to the power saving mode. Therefore, the affirmative result is obtained in step 32 (see FIG. 9), and the devices other than the print engine 16 are controlled to enter the power saving mode. FIG. 8B shows this state.

It is assumed that the smartphone 170 attempts to connect to the image forming apparatus 1B by Wi-Fi direct in this state. In this case, the resumption operation of the devices in the power saving mode proceeds according to the procedure described in the above exemplary embodiment.

In the present exemplary embodiment, the print engine 16, unlike the other devices, is maintained in an operable state. Therefore, in the image forming apparatus 1B of the present exemplary embodiment, when the main CPU 111B resumes from the power saving mode, printing by the print engine 16 starts.

As a result, the user's waiting time from resumption from the power saving mode to the start of printing can be shortened.

Other Exemplary Embodiments

The exemplary embodiments of the present disclosure have been described above. It is noted that the technical scope of the present disclosure is not limited to the scope described in the above exemplary embodiments. It is clear from the recitation of claims that various modifications or improvements that are made in the exemplary embodiments described above are also included in the technical scope of the present disclosure.

For example, in the above exemplary embodiments, the image forming apparatus 1 (see FIG. 1) is illustrated as an example of the information processing apparatus. The information processing apparatus may be any apparatus so long as (i) the apparatus includes a CPU that controls the operation of the overall system and another CPU that controls the operation of a device, and (ii) the apparatus is compatible with the power saving mode.

In the above exemplary embodiments, the case in which the image forming apparatus 1 has multiple functions has been described. It is noted that an apparatus specialized for a specific function may be used. For example, the information processing apparatus may be a printing apparatus or a scanner as a single function apparatus.

In the exemplary embodiment 3, the print engine 16 (see FIGS. 8A to 8C) is excluded from the target to be shifted to the power saving mode. Alternatively, the scanner 17 (see FIG. 1) may be excluded from the target to be shifted to the power saving mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first controller comprising a first CPU configured to control an operation of the overall information processing apparatus; and
a second controller comprising a second CPU configured to:
detect a trigger of resumption from a power saving mode, the trigger of resumption indicating a source from where the trigger is originating from;
in response to the detection of the trigger of resumption from the power saving mode:
notify the first controller of the detection of the trigger,
determine the source of the trigger of resumption;
identify a function stored in association with the determined source of the trigger of resumption;
initialize, in parallel, a bus of the first controller and a bus of the second controller, wherein the initialization of the second controller occurs without waiting for initialization instructions from the first controller;
in response to the identification of the function stored in association with the determined source of the trigger and in response to confirming a completion of the initialization on the second controller, begin initializing of the function corresponding to the trigger.

2. The information processing apparatus according to claim 1, wherein the second controller starts to initialize only the function corresponding to the detected trigger.

3. The information processing apparatus according to claim 2, wherein the second controller refers to a storage area, in which a relationship between the trigger and the function to be initialized is recorded, to specify the function to be initialized.

4. The information processing apparatus according to claim 1, wherein when detecting the trigger of the resumption from the power saving mode, the second controller notifies the first controller of the detection of the trigger and information indicating a content of the trigger.

5. The information processing apparatus according to claim 4, wherein the first controller limits a driver to be initialized when the resumption from the power saving mode is performed, to a driver corresponding to the trigger notified from the second controller.

6. The information processing apparatus according to claim 1, wherein when shifting to the power saving mode is performed during activation of a specific function, the first controller excludes a predetermined device from a target to be shifted to the power saving mode.

7. The information processing apparatus according to claim 6, wherein
the specific function is Wi-Fi direct, and
the predetermined device is (i) a machine comprising a print engine configured to print an image on paper or (ii) a scanner configured to read an image from an original document.

8. An information processing apparatus comprising:
first means for controlling an operation of the overall information processing apparatus; and
second means for:
  controlling an operation of a device
  detecting a trigger of resumption from a power saving mode, the trigger of resumption indicating a source from where the trigger is originating from;, wherein
  in response to the detection of the trigger of resumption from the power saving mode the second means:
    notifies the first means of the detection of the trigger,
    determines the source of the trigger of resumption;
    identify a function stored in association with the determined source of the trigger of resumption;
    initialize, in parallel, a bus of the first means and a bus of the second means, wherein the initialization of the second means occurs without waiting for initialization instructions from the first means;
  in response to the identification of the function stored in association with the determined source of the trigger and in response to confirming a completion of the initialization on the second means, begins initializing of the function corresponding to the trigger.

* * * * *